United States Patent
Oshino et al.

(10) Patent No.: US 11,052,314 B2
(45) Date of Patent: Jul. 6, 2021

(54) STORAGE MEDIUM, INFORMATION-PROCESSING DEVICE, INFORMATION-PROCESSING SYSTEM, AND INFORMATION-PROCESSING METHOD

(71) Applicant: NINTENDO CO., LTD., Kyoto (JP)

(72) Inventors: Yosuke Oshino, Kyoto (JP); Junya Okamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/774,408

(22) Filed: Jan. 28, 2020

(65) Prior Publication Data

US 2020/0246698 A1 Aug. 6, 2020

(30) Foreign Application Priority Data

Feb. 1, 2019 (JP) .............................. JP2019-017056

(51) Int. Cl.
*A63F 13/493* (2014.01)
*A63F 13/35* (2014.01)

(52) U.S. Cl.
CPC ............ *A63F 13/493* (2014.09); *A63F 13/35* (2014.09)

(58) Field of Classification Search
None
See application file for complete search history.

(56) References Cited

U.S. PATENT DOCUMENTS

2019/0192962 A1* 6/2019 Kasuno ................. A63F 13/235
2020/0254335 A1* 8/2020 Taura .................... A63F 13/211

OTHER PUBLICATIONS

"Super Mario Maker", searched Jan. 10, 2019, URL: https://www.nintendo.co.jp/wiiu/amaj/guide/index.html, with English counterpart, https://www.nintendo.com/consumer/downloads/manual-WiiU-Super_Mario_Maker.pdf—31 pages.

* cited by examiner

*Primary Examiner* — Ronald Laneau
(74) *Attorney, Agent, or Firm* — Nixon & Vanderhye PC (57) ABSTRACT

A game system, on detecting in a first mode that is a mode set at the start of a game that an activation condition of a second mode has been satisfied, changes the first mode to the second mode. After activating the second mode, the game system decreases the number of times that a progress of the game can be reset. When detecting that the number of times has expired, the game system ends the game.

20 Claims, 7 Drawing Sheets

STORAGE MEDIUM, INFORMATION-PROCESSING DEVICE, INFORMATION-PROCESSING SYSTEM, AND INFORMATION-PROCESSING METHOD

CROSS REFERENCE TO RELATED APPLICATIONS

The disclosure of Japanese Patent Application No. 2019-17056, filed on Feb. 1, 2019, is incorporated herein by reference.

FIELD

An embodiment of the present invention relates to multi-play of a game.

BACKGROUND AND SUMMARY

There is known in the art a game in which a player can create and play a game course.

An embodiment of the present invention provides a non-transitory computer readable storage medium having stored therein an information processing program to be executable by one or more computer processors of an information processing apparatus, wherein the information processing program causes the one or more computer processors to execute: running a multi-player game in a first mode or in a second mode, the first mode being a mode set at a start of the game; upon detecting that one of players has become unable to continue playing the game and a number of allowable resets of the one of players is more than zero, resetting a progress of the game of the one of players and resume the game; in the first mode, setting the number of allowable resets as infinite; detecting that one of the players has dropped out of playing the game in the first mode; upon detecting that a predetermined number or more of the players have dropped out of playing the game, changing the first mode to the second mode; when the first mode is changed to the second mode, changing the number of allowable resets from infinite to finite; when the reset is performed in the second mode, decreasing the number of allowable resets of the one of players; and upon detecting that the number of allowable resets of the one of players is zero, ending the game of the one of players.

DETAILED DESCRIPTION OF NON-LIMITING EXAMPLE EMBODIMENTS

1. Embodiment

1-1. Configuration

A communication system according to an embodiment of the present invention will be described with reference to the drawings.

Figure 1:
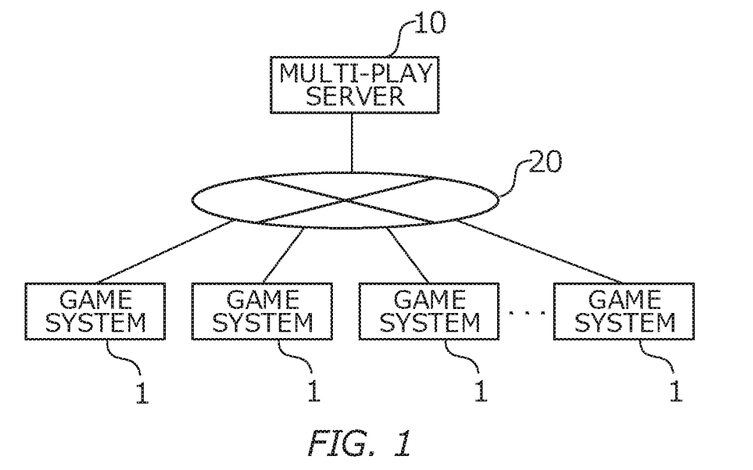
FIG. 1 is a diagram showing an example of a configuration of a communication system.

FIG. 1 is a block diagram showing an example of a configuration of the communication system. The communication system shown in the drawing includes plural game systems 1 and multi-play server 10, which are connected by communication network 20 such as the Internet or a LAN so that they can communicate with each other. A player of game system 1 performs a multi-play with another player who is matched with the player by multi-play server 10, or another player who is selected by the player. The term multi-play as used herein refers to a situation in which multiple players play a game in a game space. Below, game system 1 will be described in detail.

Figure 2:
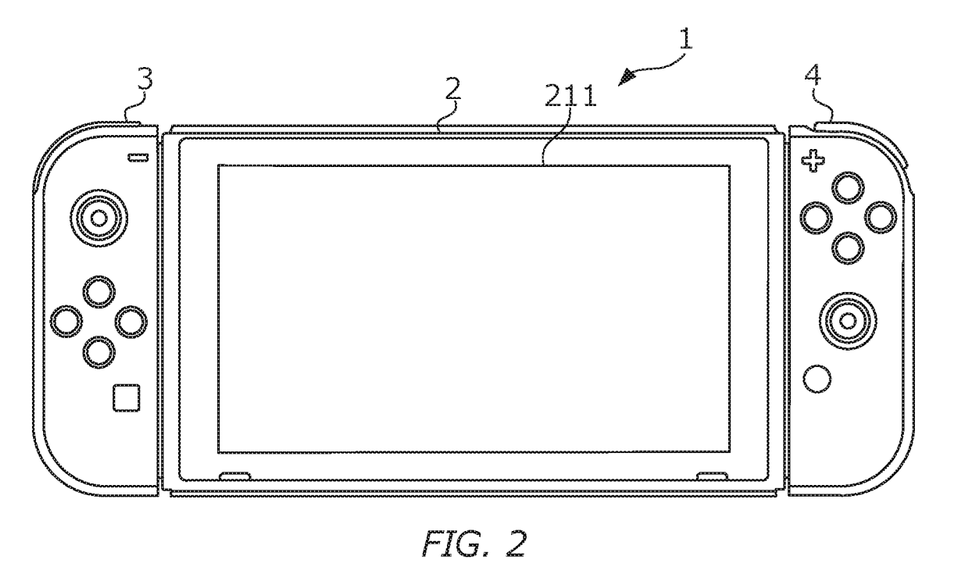
FIG. 2 is a diagram showing an example of an appearance of game system 1.

FIG. 2 is a diagram showing an example of an appearance of game system 1. As shown in the drawing, game system 1 includes main device 2, left controller 3, and right controller 4. Left controller 3 and right controller 4, which may hereinafter be collectively referred to as "controller," can be attached to and detached from main device 2. Gamey system 1 can be used either in a state in which left controller 3 and right controller 4 are attached to main device 2 or in another state in which left controller 3 and right controller 4 are detached from main device 2.

Figure 3:
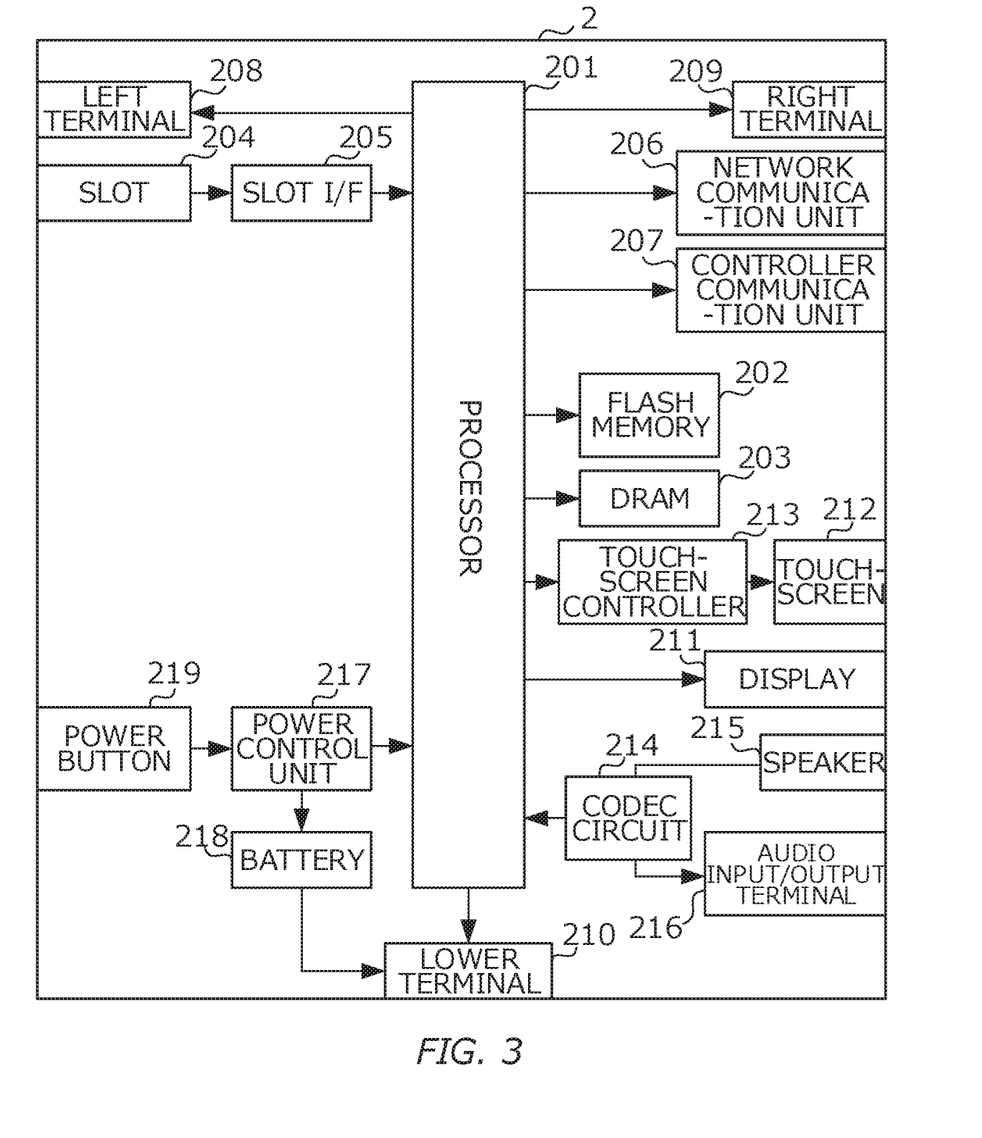
FIG. 3 is a block diagram showing an example of an internal configuration of main device 2.

FIG. 3 is a block diagram showing an example of an internal configuration of main device 2. As shown in the drawing, main device 2 includes processor 201, which is an information-processing unit for carrying out various types of information processing. Processor 201 may include only a central processing unit (CPU), or it may include a System-on-a-chip (SoC) having plural functions such as a CPU function or a graphics processing unit (GPU) function. Processor 201 may execute a program stored in an internal storage medium or an external storage medium inserted into slot 204, thereby carrying out various types of information processing.

Main device 2 also includes flash memory 202 and dynamic random access memory (DRAM) 203 as an example of an internal storage medium. Flash memory 202 is a non-volatile memory for storing various types of data, and DRAM 203 is a volatile memory for temporarily storing various types of data.

Main device 2 also includes slot 204 and slot interface (hereinafter abbreviated to "I/F") 205. Slot 204 is provided on the upper side of the housing of main device 2 and is shaped such that an external storage medium such as a memory card may be inserted thereinto. Slot I/F 205 may read and write data from and to an external storage medium inserted into slot 204 in accordance with instructions from processor 201.

Main device 2 also includes network communication unit 206 that may wirelessly communicate with an external device using a wireless LAN or infrared communication.

Main device 2 also includes controller communication unit 207 that may wirelessly communicate with left controller 3 and right controller 4 by use of a near field communication technique such as Bluetooth (registered trademark).

Main device 2 also includes left side terminal 208, right side terminal 209, and lower side terminal 210. Left side terminal 208 is a terminal for enabling main device 2 to perform wired communication with left controller 3. Right terminal 209 is a terminal for enabling main device 2 to perform wired communication with right controller 4. Lower terminal 210 is a terminal for enabling main device 2 to communicate with a cradle. While connected to the cradle, main device 2 can output images and sounds to an external stationary monitor via the cradle.

Main device 2 also includes display 211 that is a display device such as a liquid crystal display or an organic EL display.

Main device 2 also includes touch-screen 212 and touch-screen controller 213. Touch-screen 212 is, for example, a capacitive touch screen, which is layered on top of display 211, and touch-screen controller 213 is a circuit for controlling touch-screen 212. Touch-screen controller 213 may generate data indicative of a touched position based on a signal output from touch-screen 212, and output the data to processor 201.

Main device 2 also includes codec circuit 214, speaker 215, and audio input/output terminal 216. Codec circuit 214 is a circuit for controlling input and output of audio data to speaker 215 and audio input/output terminal 216.

Main device 2 also includes power control unit 217, battery 218, and power button 219. Power control unit 217 may control supply of power from battery 218 to components of main device 2 under control of processor 201.

Figure 4:
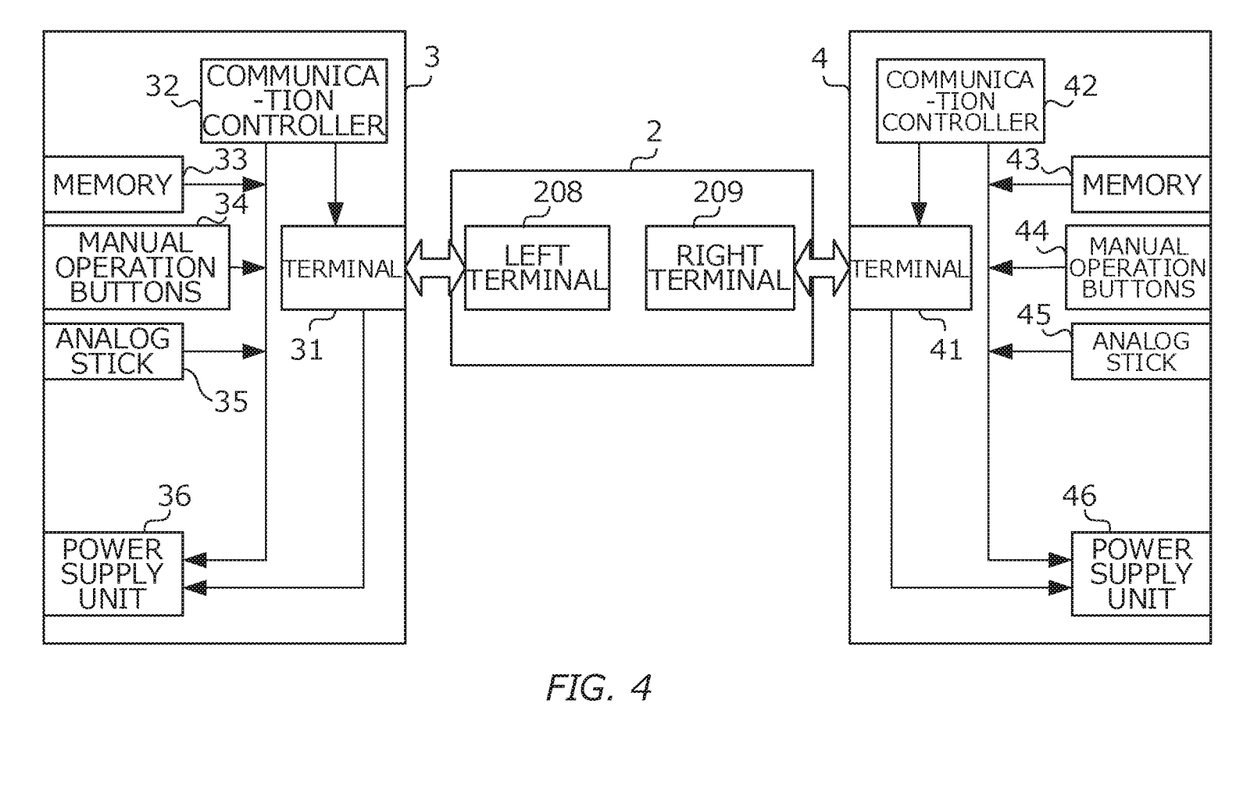
FIG. 4 is a block diagram showing an example of an internal configuration of left controller 3 and right controller 4.

FIG. 4 is a block diagram showing an example of an internal configuration of left controller 3 and right controller 4. As shown in the drawing, left controller 3 includes terminal 31 for enabling left controller 3 to perform wired communication with main device 2.

Left controller 3 includes communication controller 32 that includes a microprocessor and may control communication with main device 2. Communication controller 32 is capable of both wired communication via terminal 31 and wireless communication not via terminal 31 with main device 2. When left controller 3 is attached to main device 2, communication controller 32 performs wired communication with main device 2 via terminal 31, whereas when left controller 3 is not attached to main device 2, communication controller 32 performs wireless communication with main device 2.

Left controller 3 also includes memory 33 such as a flash memory. Communication controller 32 may execute firmware stored in memory 33 to carry out various types of processing.

Left controller 3 also includes various manual operation buttons 34 and analog stick 35, each of which may output manual operation data to communication controller 32. Communication controller 32 may send obtained manual operation data to main device 2.

Left Controller 3 also includes power supply unit 36 that includes a battery and a power control circuit.

Right controller 4 includes terminal 41 for enabling right controller 4 to perform wired communication with main device 2.

Right controller 4 includes communication controller 42 that includes a microprocessor and may control communication with main device 2. Communication controller 42 is capable of both wired communication via terminal 41 and wireless communication not via terminal 41 with main device 2. When right controller 4 is attached to main device 2, communication controller 42 performs wired communication with main device 2 via terminal 41, whereas when right controller 4 is not attached to main device 2, communication controller 42 performs wireless communication with main device 2.

Right controller 4 also includes memory 43 such as a flash memory. Communication controller 42 may execute firmware stored in memory 43 to carry out various types of processing.

Right controller 4 also includes various manual operation buttons 44 and analog stick 45, each of which may output manual operation data to communication controller 42. Communication controller 42 may send obtained manual operation data to main device 2.

Right controller 4 also includes power supply unit 46 that includes a battery and a power control circuit.

Figure 5:
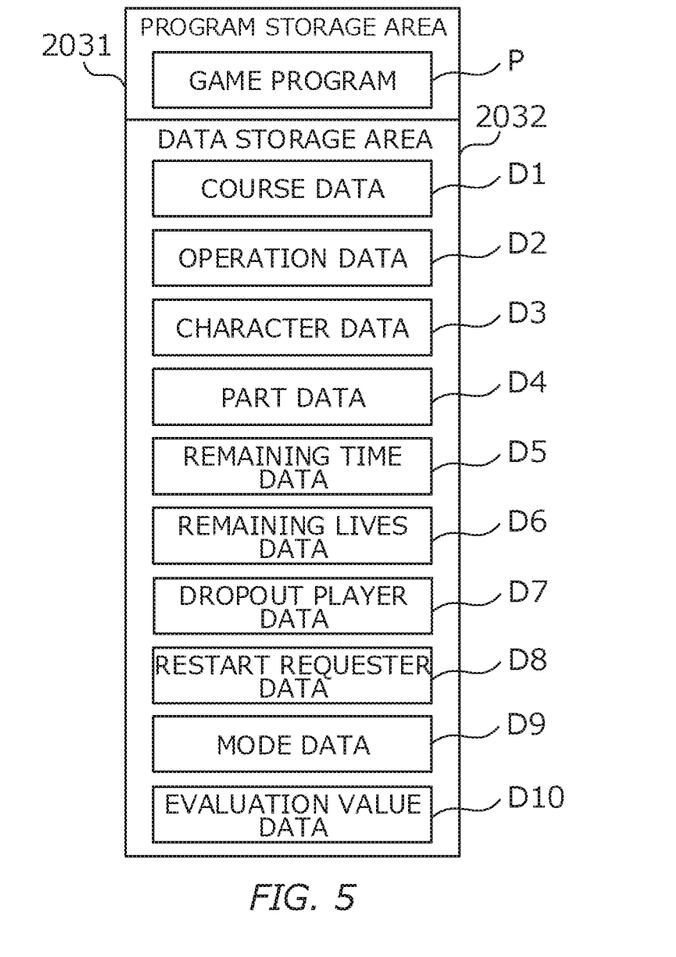
FIG. 5 is a diagram showing an example of a memory map of DRAM 203.
Figure 6:
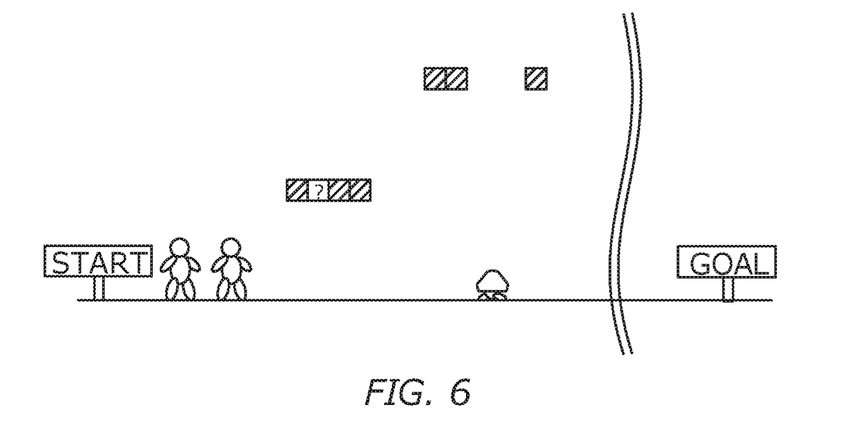
FIG. 6 is a diagram showing an example of a game course.

FIG. 5 is a diagram showing an example of a memory map of DRAM 203 described above. DRAM 203 shown in the drawing includes program storage area 2031 and data storage area 2032. Program storage area 2031 stores game program P that is a program of a multi-player game, which program is loaded from flash memory 202 or an external storage medium to program storage area 2031. Game program P may be distributed via a network such as the Internet or a non-transitory storage medium. Game program P provides a multi-player game in which plural players simultaneously play a variety of game courses to compete for a higher evaluation value, the evaluation value increasing or decreasing depending on whether a player has finished a game course. In each of the game courses, each player plays a two-dimensional horizontal-scrolling action game. FIG. 6 is a diagram showing an example of a game course of the action game. The object of the action game is to move a player character from the start point to the goal point. If a player has succeeded in moving his/her character to the goal point, the player finishes the game course.

Data storage area 2032 stores data for enabling a player to participate in a multi-player game. Specifically, data storage area 2032 stores course data D1, operation data D2, character data D3, part data D4, remaining time data D5, remaining lives data D6, dropout player data D7, restart requester data D8, mode data D9, and evaluation value data D10.

Course data D1 is data indicative of an arrangement of parts in a game course. Course data D1 is created and uploaded to a server (not shown) by a player of game system 1, and the uploaded course data is downloaded to game system 1 to be used therein. Parts in a game course indicated by course data D1 are divided into blocks, items, and enemy characters.

Operation data D2 is data on operations performed by players participating in a multi-player game. Operation data D2 is periodically updated to the latest data. Operation data D2 of other players is obtained from other game systems 1 via communication network 20.

Character data D3 is data indicative of positions and states of player characters present in a game course that is currently being played. Character data D3 is periodically updated to the latest data.

Part data D4 is data indicative of positions and states of blocks, items, and enemy characters present in a game course that is currently being played. Part data D4 is periodically updated to the latest data.

Remaining time data D5 is data indicative of a remaining time in a game course that is currently being played.

Remaining lives data D6 is data indicative of the numbers of remaining lives (in other words, the numbers of times a game course can be restarted) for players in a game course that is currently being played.

Dropout player data D7 is data indicative of players who have dropped out of playing a game course that is currently being played.

Restart requester data D8 is data indicative of players who have requested a unanimous restart in a game course that is currently being played. A description of a unanimous restart will be provided later.

Mode data D9 is data indicative of a game mode in a game course that is currently being played. A description of a game mode will be provided later.

Evaluation value data D10 is data indicative of evaluation values (or rate values) of players participating in a multi-player game.

The foregoing is a description of data storage area 2032.

Figure 7:
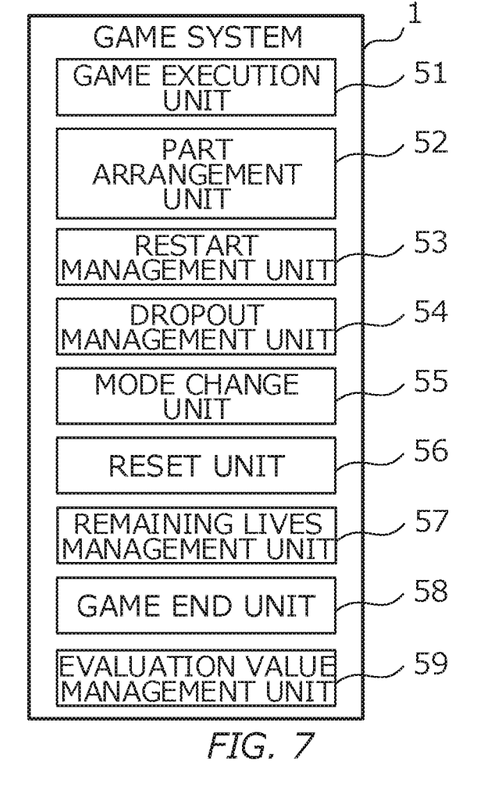
FIG. 7 is a block diagram showing an example of a functional configuration of game system 1.

When game program P loaded into program storage area 2031 is executed by processor 201, functions of game execution unit 51, part arrangement unit 52, restart management unit 53, dropout management unit 54, mode change unit 55, reset unit 56, remaining lives management unit 57, game end unit 58, and evaluation value management unit 59 are provided, as shown in FIG. 7.

Game execution unit 51 executes a multi-player game. Specifically, game execution unit 51 updates character data D3 and part data D4 based on operation data D2, to render a screen based on the updated data to be shown on display 211.

Game execution unit 51 executes the game in a first mode that is a game mode set at the start of a play of a game course, or in a second mode different from the first mode. Specifically, the first mode refers to a normal mode, and the second mode refers to a restrictive mode. In the normal mode, the number of remaining lives is set to be infinite, while in the restrictive mode, the number of remaining lives is set to be finite.

Part arrangement unit 52, at the start of a play of a game course, updates character data D3 and part data D4 based on course data D1 to arrange parts in a game space. Specifically, part arrangement unit 52 arranges blocks, items, and enemy characters.

Restart management unit 53 refers to operation data D2 to detect that a player has requested a unanimous restart of the game. The unanimous restart herein refers to a process of resetting a progress of the game and game objects on condition that the unanimous restart is requested by all players other than dropout players. Among game courses, there is a one-chance game course, in which initialization of game objects may be needed to enable a player to finish the game course; accordingly, the unanimous restart function is provided. For example, in a game course in which a player's character needs to step on an enemy character to jump to a high position, if the player defeats the enemy character before stepping on it, the player will not be able to finish the game course. To enable the player to finish the game course, the defeated enemy character (game object) needs to be restored. However, in a multi-play in which a state of the game course is shared with other players, initialization of game objects may cause a situation that is inconvenient for other players (for example, a situation in which an enemy character, which other players consider to have disappeared, is restored). Therefore, to perform initialization of game objects such as blocks and enemy characters in the game course, it is required that it is requested by all players other than dropout players. Restart management unit 53, when detecting a request for a unanimous restart, records identification information of the requester as restart requester data D8.

Figure 8:
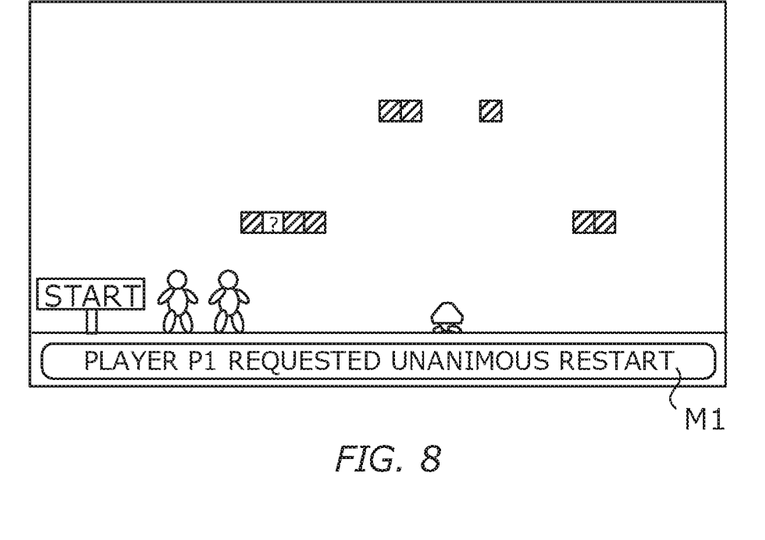
FIG. 8 is a diagram showing an example of a game play screen.
Figure 9:
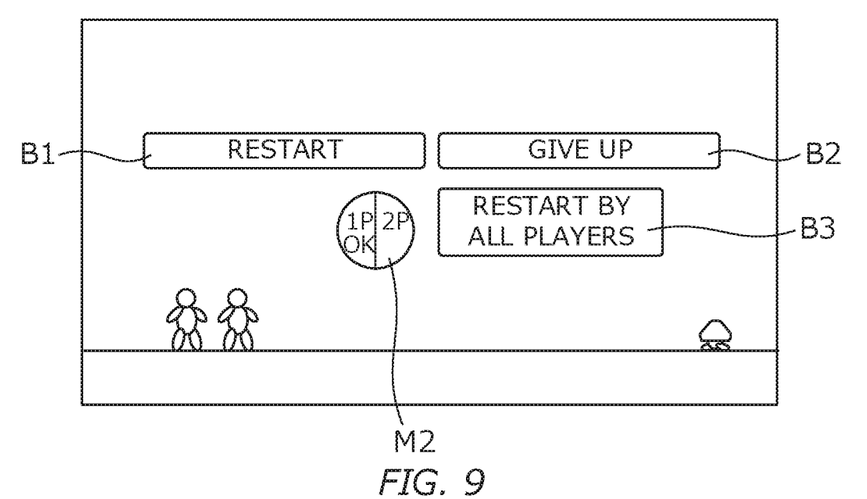
FIG. 9 is a diagram showing an example of a pause screen.

When detecting a request for a unanimous restart, restart management unit 53 performs display to notify which player has requested the unanimous restart to the other players. Specifically, restart management unit 53, immediately after detecting the request, superimposes a message notifying which player has requested the unanimous restart on a game play screen, while letting a player continue playing the game. FIG. 8 is a diagram showing an example of a game play screen on which such a message is superimposed. At the bottom of the screen, message M1 notifying that player P1 has requested a unanimous restart is shown. Also, restart management unit 53 superimposes such a message on a pause screen that is displayed in response to a player's predetermined operation. FIG. 9 is a diagram showing an example of a pause screen on which such a message is superimposed. On the screen shown in the drawing, message M2, notifying that among players P1 and P2, player P1 has requested a unanimous restart, is shown. It is of note that buttons B1 to B3 shown in the drawing are an individual restart request button, a dropout request button, and a unanimous restart request button, respectively. Among these buttons, individual restart request button B1 is a button for requesting an individual restart. The individual restart herein refers to a process of resetting a progress of the game of a player in response to the player's request. Specifically, the individual restart refers to a process of, in response to a request from a player, resetting a position and a state of the player's character, without resetting other players' characters, objects in a game course such as enemy characters and blocks, and a remaining time.

Restart management unit 53, when detecting that a player's number of remaining lives is a predetermined number (for example, "1") or less in the restrictive mode, prevents the player from requesting a unanimous restart. Specifically, after detecting that a player's number of remaining lives is a predetermined number or less in the restrictive mode, restart management unit 53 causes unanimous restart request button B3 described above to be grayed out to prevent the button from being selected. Also, restart management unit 53, when detecting that a player's number of remaining lives is the predetermined number or less after the player has requested a unanimous restart, cancels the request and displays, only to the player who made the request, a message notifying that the request has been canceled. The reason that restart management unit 53 prevents a player whose number of remaining lives is the predetermined number or less from requesting a unanimous restart is that when a unanimous restart is activated, the player's number of remaining lives will be reduced; accordingly, if a unanimous restart can be activated when the number of remaining lives is the predetermined number or less, the player's remaining lives would be so limited that the player cannot enjoy playing the game. In particular, in a case where the player's number of remaining lives is one, activation of a unanimous restart would reduce the number of remaining lives to zero, whereby the player would be unable to continue playing the game. For such a player, activation of a unanimous restart is meaningless.

Restart management unit 53 refers to restart requester data D8 to determine whether all players other than dropout players have requested a unanimous restart. If it is determined that all players other than dropout players have requested a unanimous restart, restart management unit 53 outputs a reset request to reset unit 56.

Dropout management unit 54 detects that a player has dropped out of playing a game course. Specifically, dropout management unit 54 refers to operation data D2 to detect a player who has selected dropout request button B2 described above, as a dropout player. Dropout management unit 54 also refers to remaining lives data D6 to detect a player whose number of remaining lives is "0," as a dropout player. When detecting a dropout player, dropout management unit 54 records identification information of the dropout player as dropout player data D7.

Mode change unit 55 determines in the normal mode whether an activation condition of the restrictive mode is satisfied, and if it is determined that an activation condition is satisfied, changes a game mode indicated by mode data D9 from the normal mode to the restrictive mode. A situation in which an activation condition is satisfied is that a predetermined number or more of participating players have dropped out of playing a game course, or that a play time of a game course has reached a time limit (in other words, a remaining time has decreased to "0"). The former situation refers, for example, to a situation that one out of two players has dropped out, that two out of three players have dropped out, and that two out of four players have dropped out.

Mode change unit 55, after activating the restrictive mode, superimposes on a game play screen a message notifying that the restrictive mode has been activated (for example, a message notifying that when a remaining time or the number of remaining lives has decreased to zero, the game comes to an end). After the restrictive mode is activated, when a remaining time decreases to zero or remaining lives are all consumed, a multi-play of a game course comes to an end. Mode change unit 55, on determining that a play time of a game course has reached a time limit, and consequently activating the restrictive mode, outputs a reset request to reset unit 56.

Reset unit 56, when detecting that a reset condition is satisfied, resets a progress of the game indicated by character data D3, game objects indicated by part data D4, and/or a remaining time. A situation in which a reset condition is satisfied is that a player has become unable to continue playing a game course, that a player has requested an individual restart, that reset unit 56 has received a reset request from restart management unit 53, that reset unit 56 has received a reset request from mode change unit 55, or that all players other than dropout players, after a reset is performed, have become unable to continue playing a game course at a game restart position. Among these five situations, the first situation refers, specifically, to a situation that a player's character has died. When a player's character dies, reset unit 56 resets a progress of the game of the player. The second situation refers, specifically, to a situation that a player has selected individual restart request button B1. When a player selects individual restart request button B1, reset unit 56 resets a progress of the game of the player who has requested an individual restart. The third situation refers, specifically, to a situation that all players other than dropout players have requested a unanimous restart. When all players other than dropout players request a unanimous restart, reset unit 56 resets progress of the game of each of the players other than dropout players, and game objects. The fourth situation refers, specifically, to a situation that a remaining time has decreased to zero, whereby the restrictive mode has been activated. When the restrictive mode is activated, reset unit 56 resets progress of the game of each of the players other than dropout players, a remaining time, and game objects. The fifth situation refers, specifically, to a situation that all players other than dropout players, after a reset is performed, are forced to resume the game, for example, from a position covered by lava, whereby the players die immediately after the game is resumed. In such a situation, reset unit 56 resets progress of the game of each of the players other than dropout players, and game objects.

Remaining lives management unit 57, after mode change unit 55 changes a game mode from the normal mode to the restrictive mode, decreases players' numbers of remaining lives indicated by remaining lives data D6. Specifically, remaining lives management unit 57 changes players' numbers of remaining lives from infinite to finite (for example, five). After the restrictive mode is activated, remaining lives management unit 57, each time reset unit 56 performs a reset, decreases a player's number of remaining lives by one, in principle. When the reset is performed because a player's character has died, remaining lives management unit 57 reduces the player's number of remaining lives by one, and when the reset is performed because a player has requested an individual restart, remaining lives management unit 57 decreases the player's number of remaining lives by one. When the reset is performed because a unanimous restart has been activated, remaining lives management unit 57 decreases the numbers of remaining lives of each of the players other than dropout players by one. However, when the reset is performed because all players other than dropout players, after a reset is performed, are unable to continue playing the game at a game restart position, remaining lives management unit 57 does not decrease the players' numbers of remaining lives. This is because if the number of remaining lives is decreased by one in such a case, a one-time death of a player character would result in reduction of the number of remaining lives by two.

Remaining lives management unit 57, when detecting that in the normal mode a player has acquired an item for increasing the number of remaining lives, increases the player's number of remaining lives by one. However, in a case where the number of remaining lives is set to be infinite in the normal mode, remaining lives management unit 57 does not increase the player's number of remaining lives. Further, when detecting that in the restrictive mode a player has acquired the item, remaining lives management unit 57 does not increase the player's number of remaining lives. This is because if the number of remaining lives is increased, a conclusion of the game would be delayed, contrary to the purpose of the restrictive mode.

Game end unit 58, when one of game end conditions is satisfied for each of players participating in a multi-play of a game course, ends the multi-play. The game end conditions include finishing a game course, running out remaining lives, running out of time in the restrictive mode, or dropping out of playing a game course.

Evaluation value management unit 59, after a multi-play of a game course ends, updates evaluation value data D10 of each player based on the player's performance. When doing so, evaluation value management unit 58 determines that a player who has finished the game course is a winner, and increases an evaluation value for the player, and determines that a player who has failed to finish the game course is a loser, and decreases an evaluation value for the player. If all players have failed to finish the game course, evaluation value management unit 58 determines that the match is a draw, and does not increase or decrease their evaluation values. It is of note that, as a modification, when determining that the match is a draw, evaluation value management unit 58 may decrease all players' evaluation values by a smaller value than when determining that a player is a loser.

1-2. Operation

Operations of game system 1 will be described. In the following, in particular, an operation performed when the restrictive mode is activated and an operation performed when a unanimous restart is activated will be described.

1-2-1. Operation Performed when the Restrictive Mode is Activated

Figure 10:
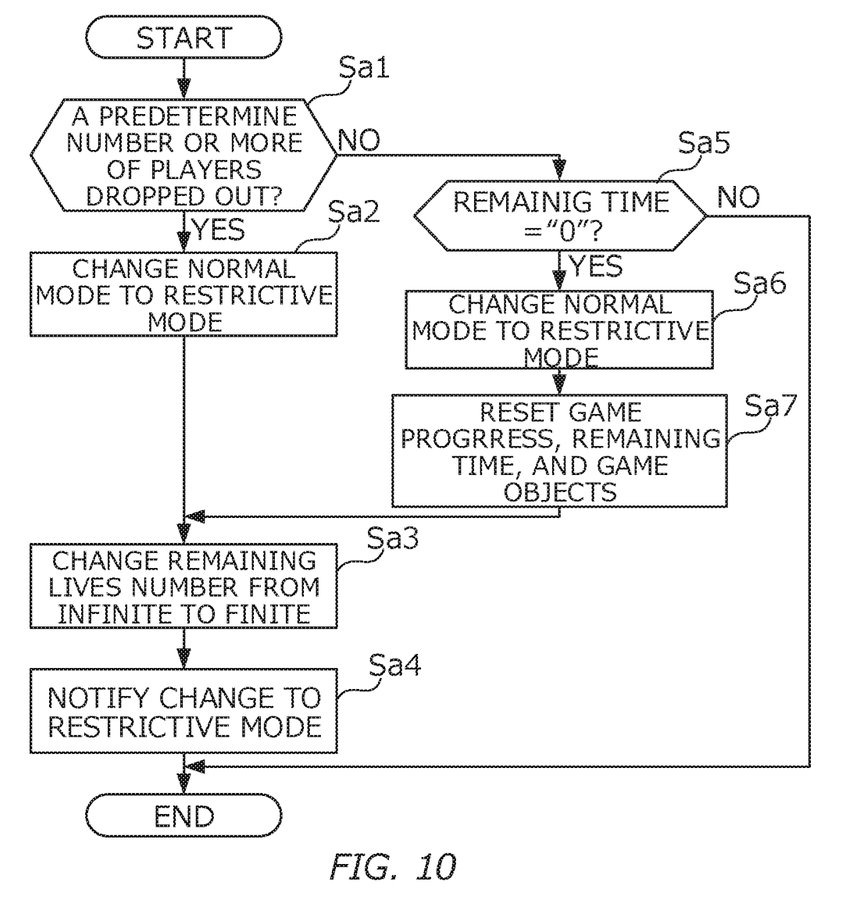
FIG. 10 is a flowchart showing an example of an operation performed when a restrictive mode is activated.

FIG. 10 is a flowchart showing an example of the operation performed when the restrictive mode is activated.

Mode change unit 55 refers to dropout player data D7 to determine whether a predetermined number or more of participating players have dropped out of playing a game course (step Sa1). As a result of the determination, when a predetermined number or more of participating players have dropped out of playing a game course (YES at step Sa1), mode change unit 55 changes a game mode indicated by mode data D9 from the normal mode to the restrictive mode (step Sa2). After mode change unit image conversion unit 55 changes a game mode from the normal mode to the restrictive mode, remaining lives management unit 57 decreases players' numbers of remaining lives indicated by remaining lives data D6. Specifically, remaining lives management unit 57 changes players' numbers of remaining lives from infinite to finite (for example, five) (step Sa3). In addition, mode change unit 55 superimposes a message notifying that the restrictive mode has been activated (for example, a message notifying that when a remaining time or the number of remaining lives has decreased to zero, the game comes to an end) on a game play screen (step Sa4).

As a result of the determination at step Sa1, when a predetermined number or more of participating players have not dropped out of playing a game course (NO at step Sa1), mode change unit 55 refers to remaining time data D5 to determine whether a remaining time is zero (step Sa5). As a result of the determination, when a remaining time is zero (YES at step Sa5), mode change unit 55 changes a game mode indicated by mode data D9 from the normal mode to the restrictive mode (step Sa6). After mode change unit 55 changes a game mode from the normal mode to the restrictive mode, reset unit 56 resets a progress of the game, a remaining time, and game objects (step Sa7). In addition, remaining lives management unit 57 decreases players' numbers of remaining lives indicated by remaining lives data D6 (step Sa3), and mode change unit 55 superimposes a message notifying that the restrictive mode has been activated on a game play screen (step Sa4).

As a result of the determination at step Sa5, when a remaining time is not zero (NO at step Sa5), the restrictive mode is not activated, and the present operation concludes.

The foregoing is a description of the operation performed when the restrictive mode is activated.

In the above operation, when the restrictive mode is activated because a remaining time has decreased to zero, the remaining time is reset, whereas, when the restrictive mode is activated because a predetermined number or more of participating players have dropped out of playing a game course, a remaining time is not reset.

Figure 11:
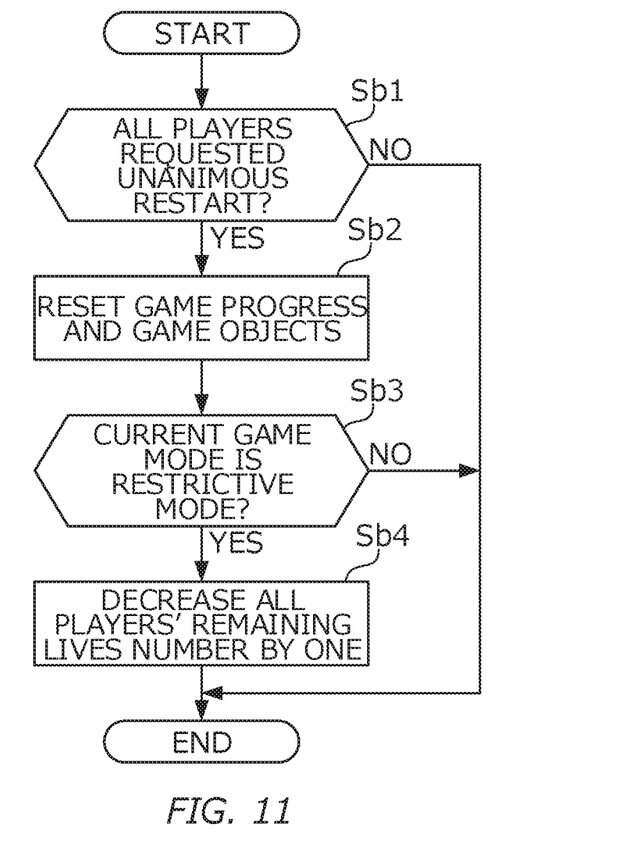
FIG. 11 is a flowchart showing an example of an operation performed when a unanimous restart comes into effect.

FIG. 11 is a flowchart showing an example of the operation performed when a unanimous restart is activated.

Restart management unit 53 refers to restart requester data D8 to determine whether all players other than dropout players have requested a unanimous restart (step Sb1). As a result of the determination, when all players other than dropout players have requested a unanimous restart (YES at step Sb1), reset unit 56 resets a progress of the game and game objects (step Sb2). At the time, the restrictive mode is not released. Subsequently, remaining lives management unit 57 refers to mode data D9 to determine whether a current game mode is the restrictive mode (step Sb3). As a result of the determination, when a current game mode is the restrictive mode (YES at step Sb3), remaining lives management unit 57 decreases the numbers of remaining lives of all players other than dropout players by one (step Sb4). On the other hand, when a current game mode is not the restrictive mode (NO at step Sb3), remaining lives management unit 57 does not decrease the numbers of remaining lives, and the present operation concludes.

As a result of the determination at step Sb1, when all participating players other than dropout players have not requested a unanimous restart (NO at step Sb1), reset unit 56 does not perform a reset, and the present operation concludes.

The foregoing is a description of the operation when a unanimous restart is activated.

As described in the foregoing, in the game executed in the present embodiment, when an activation condition is satisfied in the normal mode, the restrictive mode is activated. After the restrictive mode is activated, players' numbers of remaining lives are set to be finite, and the game ends when a remaining time has run out. Accordingly, a conclusion of the game is accelerated.

2. Modifications

The above embodiment may be modified as described below. Two or more of the following modifications may be combined with each other.

2-1. Modification 1

Game system 1 is an example of an information-processing device capable of executing game program P. Game program P may be executed in another information-processing device such as a smartphone or a PC. The functions provided by game program P may be distributed over networked information-processing devices.

2-2. Modification 2

A game provided by running game program P is not limited to a two-dimensional horizontal-scrolling action game, and may be a three-dimensional action game, for example.

2-3. Modification 3

Course data D1 may not necessarily be created by a player of game system 1, and may be created by a game development company.

2-4. Modification 4

In the normal mode, a player's number of remaining lives may be set to be finite. For example, the upper limit of the number of remaining lives may be set to twenty. In that case, remaining lives management unit 57 may decrease the number of remaining lives when the restrictive mode is activated, by halving the number of remaining lives. In another example, remaining lives management unit 57, when the number of remaining lives exceeds three, may decrease the number to three, while not decreasing the number of remaining lives when the number is equal to or smaller than two.

What is claimed is:

1. A non-transitory computer readable storage medium having stored therein an information processing program to be executable by one or more computer processors of an information processing apparatus, wherein the information processing program, when executed, causes the one or more computer processors to execute operations comprising:

running a multi-player game in a first mode or in a second mode, the game being set to run in the first mode at a start of the game;

upon detecting that one of players has become unable to continue playing the game and a number of allowable resets of the one of players is more than zero, resetting a progress of the game of the one of players and resuming the game;

in the first mode, setting the number of allowable resets as infinite;

detecting that one of the players has dropped out of playing the game in the first mode;

upon detecting that at least a predetermined number of the players have dropped out of playing the game, changing the game to run in the second mode rather than the first mode;

when the game is changed to run in the second mode, changing the number of allowable resets from infinite to finite;

when the reset is performed in the second mode, decreasing the number of allowable resets of the one of players; and upon detecting that the number of allowable resets of the one of players is zero, ending the game of the one of players.

2. The non-transitory storage medium according to claim 1, wherein the game is changed from running in the first mode to running in the second upon detecting that a time limit of the game has been reached in the first mode.

3. The non-transitory storage medium according to claim 1, wherein when the number of allowable resets for each of the players is zero, the game is determined to be a draw and an evaluation value is calculated for each of the players, the evaluation value being higher than that calculated when the game is lost.

4. The non-transitory storage medium according to claim 1, wherein the information processing program further causes the one or more computer processors to execute further operations comprising:

detecting that one of the players has requested a restart of the game; and upon detecting that all the players have requested a restart of the game, resetting a progress of the game of each of the players and game objects, and resuming the game.

5. The non-transitory storage medium according to claim 4, wherein upon detecting in the second mode that all the players have requested the restart of the game, a number of allowable resets of each of the players is decreased by one.

6. The non-transitory storage medium according to claim 4, wherein the information processing program further causes the one or more computer processors to execute further operations comprising determining whether all the players other than a player who has dropped out of playing the game have requested the restart of the game.

7. The non-transitory storage medium according to claim 4, wherein upon detecting in the second mode that the number of allowable resets of one of the players is a predetermined number or less, the one of the players is prevented from requesting the restart of the game.

8. The non-transitory storage medium according to claim 4, wherein a display is generated to enable another player to confirm which player has requested the restart of the game.

9. An information-processing device comprising:
memory; and
at least one processor configured to:
run a multi-player game in a first mode or in a second mode, the game being set to the first mode at a start of the game;
upon detecting that one of players has become unable to continue playing the game and a number of allowable resets of the one of players is more than zero, reset a progress of the game of the one of players and resume the game;
in the first mode, set the number of allowable resets as infinite;
detect that one of the players has dropped out of playing the game in the first mode;
upon detecting that at least a predetermined number of the players have dropped out of playing the game, change the game to run in the second mode rather than the first mode;
when the game is changed to run in the second mode, change the number of allowable resets from infinite to finite;
when the reset is performed in the second mode, decrease the number of allowable resets of the one of players; and
upon detecting that the number of allowable resets of the one of players is zero, end the game of the one of players.

10. An information-processing system comprising:
memory; and
at least one processor configured to:
run a multi-player game in a first mode or in a second mode, the game being set to run in the first mode at a start of the game;
upon detecting that one of players has become unable to continue playing the game and a number of allowable resets of the one of players is more than zero, reset a progress of the game of the one of players and resume the game;
in the first mode, set the number of allowable resets as infinite;
detect that one of the players has dropped out of playing the game in the first mode;
upon detecting that at least a predetermined number the players have dropped out of playing the game, change the game to run in the second mode rather than the first mode;
when the game is changed to run in the second mode, change the number of allowable resets from infinite to finite;
when the reset is performed in the second mode, decrease the number of allowable resets of the one of players; and
upon detecting that the number of allowable resets of the one of players is zero, end the game of the one of players.

11. The information-processing system according to claim 10, wherein the game is changed from running in the first mode to running in the second upon detecting that a time limit of the game has been reached in the first mode.

12. The information-processing system according to claim 10, wherein when the number of allowable resets for each of the players is zero, the game is determined to be a draw and an evaluation value is calculated for each of the players, the evaluation value being higher than that calculated when the game is lost.

13. An information-processing method comprising:
running a multi-player game in a first mode or in a second mode by at least one processor, the game being set to run in the first mode at a start of the game;

upon detecting that one of players has become unable to continue playing the game and a number of allowable resets of the one of players is more than zero, resetting a progress of the game of the one of players and resuming the game;

in the first mode, setting the number of allowable resets as infinite;

detecting that one of the players has dropped out of playing the game in the first mode;

upon detecting that at least a predetermined number of the players have dropped out of playing the game, changing the game to run in the second mode rather than the first mode by the at least one processor;

when the game is changed to run in the second mode, changing the number of allowable resets from infinite to finite;

when the reset is performed in the second mode, decreasing the number of allowable resets of the one of players; and upon detecting that the number of allowable resets of the one of players is zero, ending the game of the one of players.

14. The method according to claim 13, further comprising changing the game from running in the first mode to running in the second upon detecting that a time limit of the game has been reached in the first mode.

15. The method according to claim 13, further comprising when the number of allowable resets for each of the players is zero, determining that the game is a draw and calculating an evaluation value for each of the players, the evaluation value being higher than that calculated when the game is lost.

16. The method according to claim 13, further comprising:
   detecting that one of the players has requested a restart of the game; and
   upon detecting that all the players have requested a restart of the game, resetting a progress of the game of each of the players and game objects, and resuming the game.

17. The method according to claim 16, further comprising upon detecting in the second mode that all the players have requested the restart of the game, decreasing a number of allowable resets of each of the players by one.

18. The method according to claim 16, further comprising determining whether all the players other than a player who has dropped out of playing the game have requested the restart of the game.

19. The method according to claim 16, further comprising upon detecting in the second mode that the number of allowable resets of one of the players is a predetermined number or less, preventing the one of the players from requesting the restart of the game.

20. The method according to claim 16, further comprising generating a display to enable another player to confirm which player has requested the restart of the game.

* * * * *